June 20, 1933.  H. FELDMEIER  1,914,494
LIQUID HEATING AND COOLING APPARATUS
Filed Oct. 20, 1931  4 Sheets-Sheet 1

INVENTOR
Harvey Feldmeier
by Parker & Crochnow
ATTORNEYS

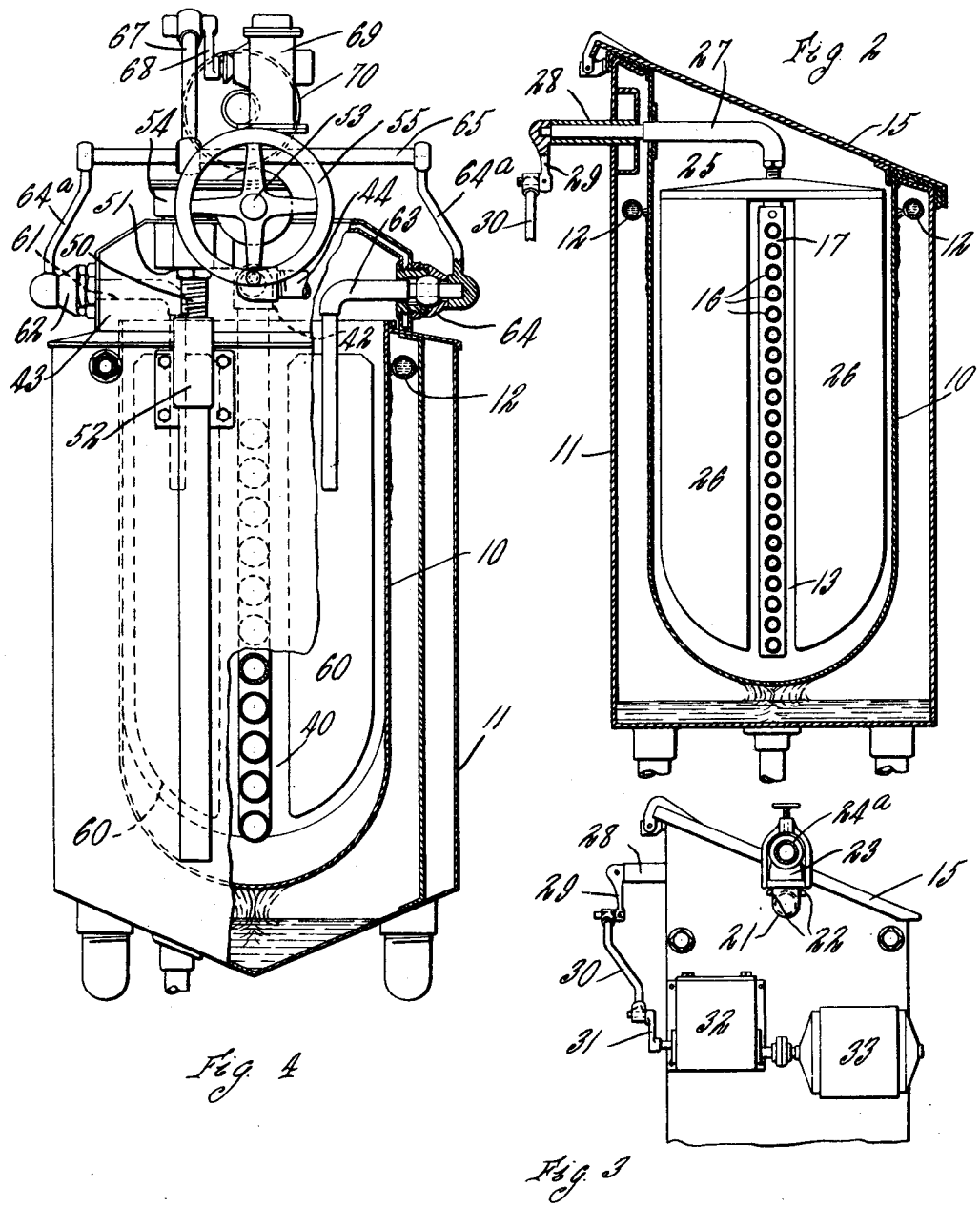

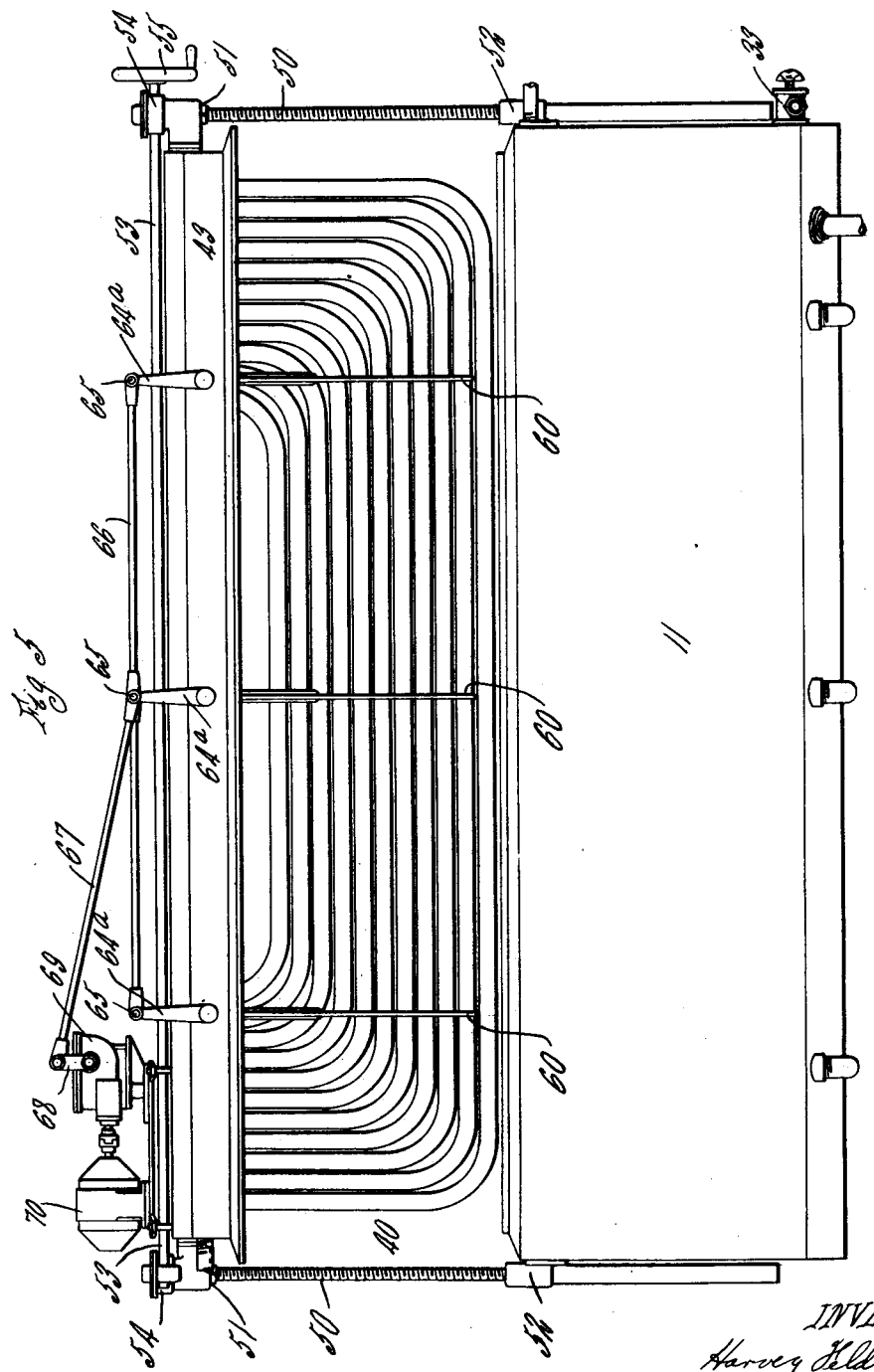

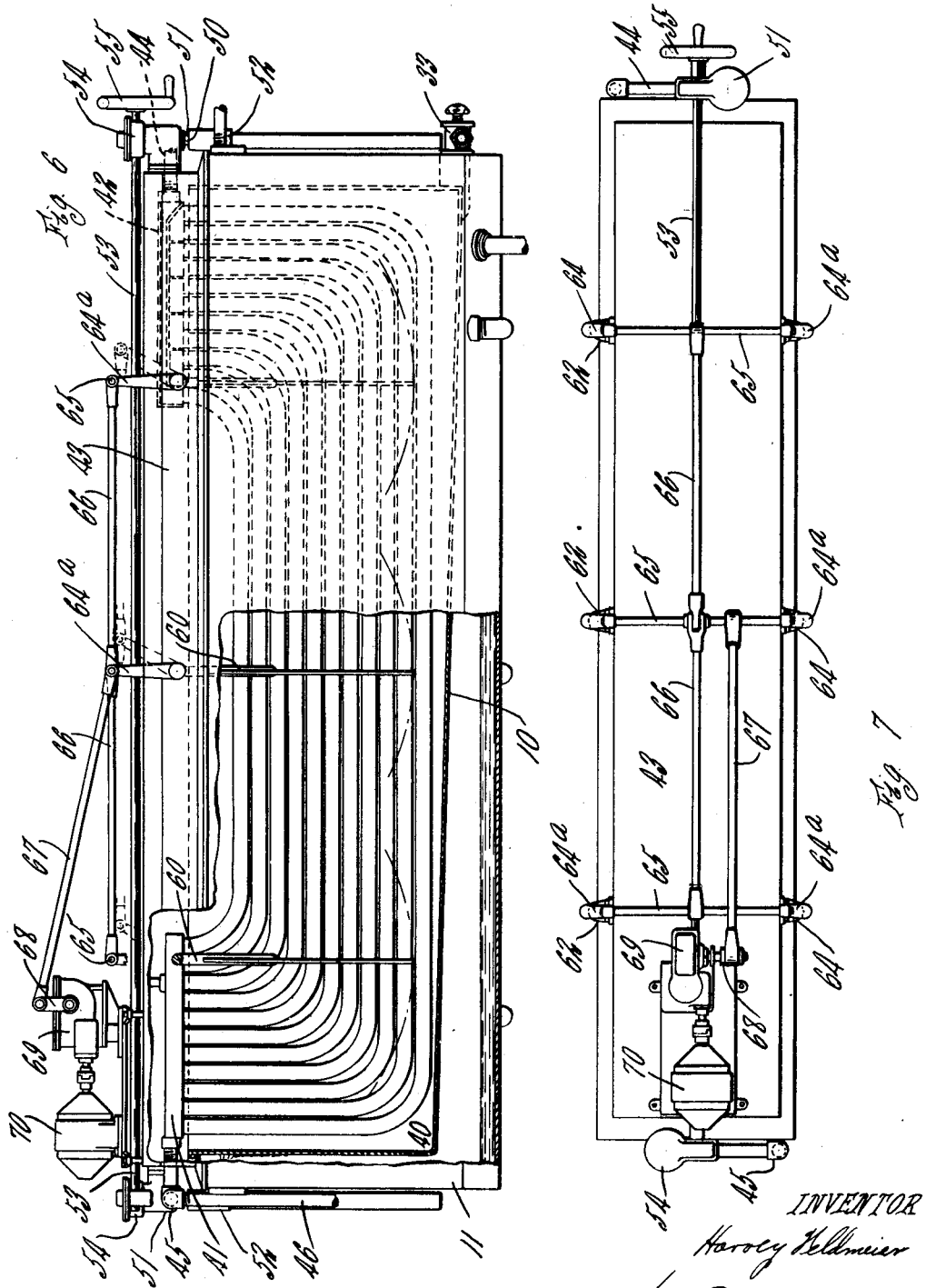

Patented June 20, 1933

1,914,494

UNITED STATES PATENT OFFICE

HARVEY FELDMEIER, OF LITTLE FALLS, NEW YORK, ASSIGNOR TO CHERRY-BURRELL CORPORATION, OF WILMINGTON, DELAWARE, A CORPORATION OF DELAWARE

LIQUID HEATING AND COOLING APPARATUS

Application filed October 20, 1931. Serial No. 569,896.

This invention relates to improvements in liquid heating and cooling apparatus of the vat type in which a body of liquid contained in a vat or tank is heated or cooled by a liquid or medium which is circulated in heat exchange relation with the body of liquid in the vat. The improvements are particularly desirable in apparatus for heating and cooling milk, as in the pasteurization thereof, and for the sake of clearness of description, the liquid to be heated or cooled will be hereinafter referred to as milk. This descriptive designation of the liquid to be treated as "milk", however, is not to be understood as limiting the invention to use in connection with this particular liquid.

Heretofore, in these vat type milk heaters and coolers, the milk has been heated or cooled either by circulating the heating or cooling medium through a coil submerged in the milk, or by spraying or discharging the heating or cooling medium on the walls of the vat so that the medium flows in a film over the outer surfaces of the walls of the vat to cause an exchange of heat between the same and the body of milk in the vat, the latter usually being stirred gently so as to cause all portions of the body of milk to contact with the walls of the vat or the coil over or through which the heating or cooling medium circulates.

One object of this invention is to produce an efficient and economical apparatus in which liquids can be quickly heated or cooled; which comprises a vat in which the body of liquid is heated or cooled by the combined action of the circulation of a medium through a coil submerged in the liquid in the vat and the flowing of a medium over the outer surface of the walls of the vat; in which the parts of the apparatus are proportioned and relatively arranged so as to insure the maximum efficiency of the apparatus and enable the heating or cooling of the liquid in the minimum time; in which the heat exchange coil and the stirring device for the liquid are arranged so as to be readily moved out of the vat into positions in which all of the parts, including the coil, stirring device and the interior surfaces of the vat, are accessible for ready and thorough cleaning; and also to improve vat liquid heating and cooling apparatus in the other respects hereinafter described and set forth in the claims.

Two structurally different embodiments of the invention are illustrated in the accompanying drawings.

In said drawings:

Fig. 2 is a transverse sectional elevation thereof.

Fig. 3 is a fragmentary end elevation thereof.

Fig. 4 is an end elevation, partly in section, of an apparatus of different construction more suitable for larger sizes.

Fig. 5 is a side elevation thereof showing the cover and coil in raised position for cleaning.

Fig. 6 is a side elevation partly in section of the same, showing the cover and coil in operative position.

Fig. 7 is a plan view of the apparatus shown in Fig. 6.

Figure 1:
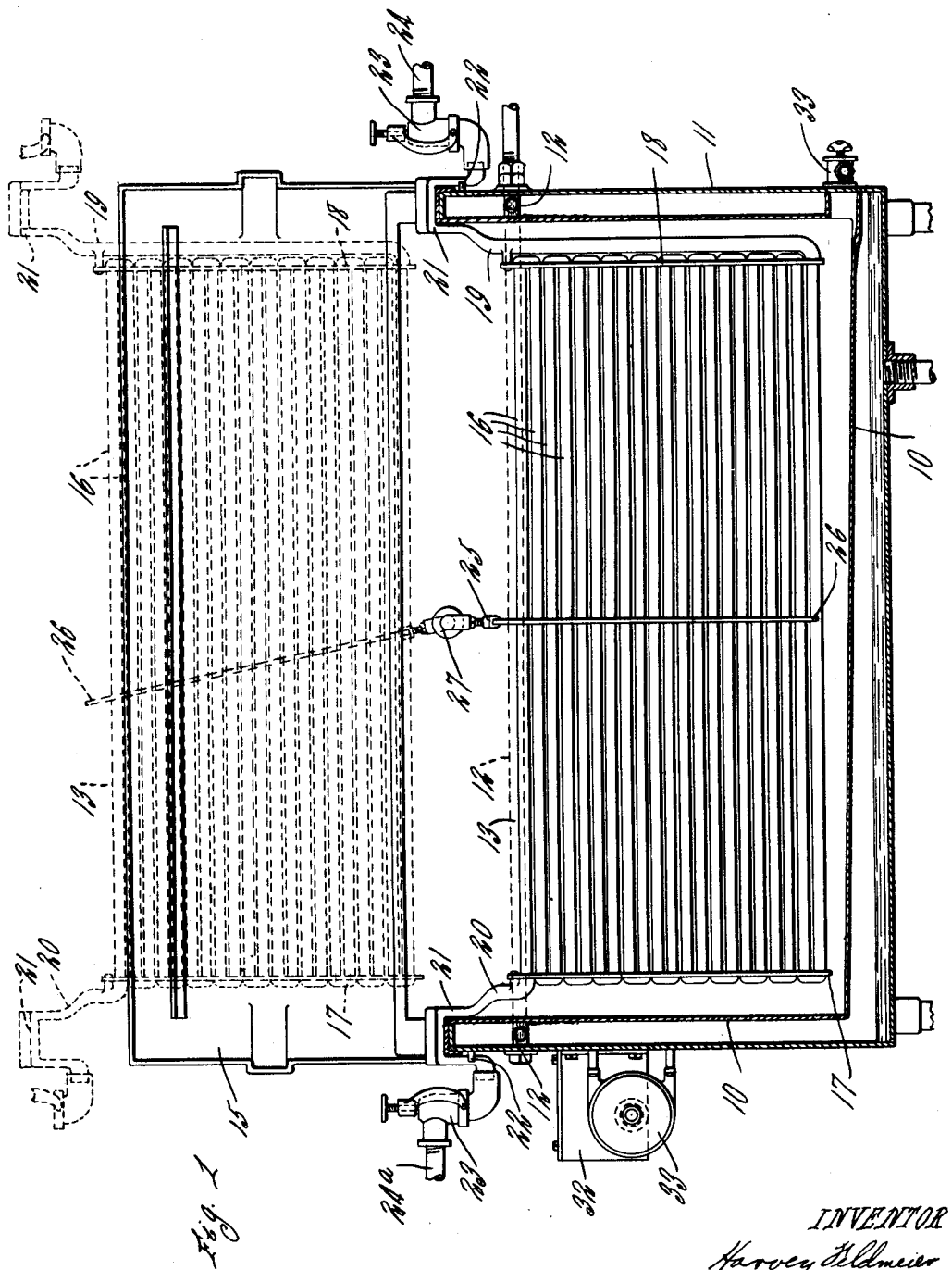
Fig. 1 is a longitudinal sectional elevation of a liquid heating and cooling apparatus of simple construction suitable for apparatus of small size, showing the vat cover open.

Figs. 1 to 3 illustrate a small apparatus of simple construction which is primarily intended for use on farms and in small dairy establishments for pasteurizing milk. First describing this construction, the device comprises a jacketed vat or tank having an inner lining or vat proper 10 in which the milk is contained, a jacket 11 which surrounds or insulates the vat 10 with a space or spaces between the walls of the jacket and of the vat, perforated pipes 12 arranged for discharging or spraying a heating or cooling medium (hereinafter termed "heat exchange medium") onto the exterior of the vat 10 in the space or spaces between the vat and jacket, and a coil 13 which is submerged in the milk in the vat and through which a heat exchange medium is also circulated. Preferably, the vat 10 is of elongated or long, narrow shape having upright narrow end walls and long side walls extending upwardly from a transversely rounded bottom, and the spray pipes 12 are arranged between both the side and end walls of the vat and jacket so that the heat exchange liquid, which is discharged from the pipes onto the upper portions of the walls of the vat, will flow in films downwardly over the upright walls and the rounded bottom of the vat and discharge or fall from the central portion of the bottom of the vat into the bottom of the jacket. The jacket may have upright side and end walls and a bottom which may be flat or transversely troughed shape, as desired. Connections (not shown) are provided for supplying or circulating the heat exchange medium so that it is discharged from the spray pipes onto the vat and may be either discharged from the jacket after flowing over the surfaces of the vat or may be drawn from the bottom of the jacket and after being reheated, returned to the spray pipes so that the heat exchange medium can be recirculated and used over and over again as customary in spray vat pasteurizers of this type. The device thus far described may be constructed as more fully shown and described in the Letters Patent Numbers 1,199,974 and 1,614,193, granted respectively October 3, 1916, and January 11, 1927, to Harvey Feldmeier.

15 represents a cover for the vat. This cover, which may be made either in sections or in one piece, is hinged at its rear side to the upper portion of the rear wall of the vat jacket so that the cover is adapted to be raised from the closed position shown in Fig. 2 to the open position at the rear of the vat shown in Fig. 1.

The heat exchange coil 13 is preferably arranged vertically lengthwise within the vat, midway between the opposite long side walls of the vat and, as shown, comprises a bank, or series of horizontal tubes 16, arranged vertically one above another and connected at their ends by headers 17 and 18 for causing the heat exchange medium to circulate in succession through the several tubes of the coil. The coil shown is provided at one end with an inlet or supply connection 19 which extends vertically at said end of the coil and is connected to one end of the lowermost tube 16, and the coil is provided at its opposite end with an outlet or discharge connection 20 which connects with one end of the uppermost tube 16 of the coil. The medium admitted to the inlet connection passes through the same into the lowermost tube coil and after traversing the several tubes of the coil, discharges through the connection 20. The inlet and outlet connections are preferably provided with inverted U-shaped portions which extend over and straddle the end walls of the vat and are adapted to rest on the upper edges of said walls for supporting the coil in the vat. The outer legs of the U-portions 21 of these connections preferably extend downwardly between pairs of guide lugs or studs 22 on the outer sides of the ends of the vat, which studs hold the coil in position centrally between the front and rear walls of the vat but permit the coil to be lifted or raised out of the vat. The inlet and outlet connections of the coil are preferably connected by quick detachable couplings 23 of any suitable sort to supply and discharge pipes 24 and 24a. These couplings can be quickly and easily operated to disconnect the coil from the supply and discharge pipes, thus leaving the coil detached so that it can be lifted out of the vat for cleaning the coil and interior of the vat.

25 represents a stirring device for gently stirring or moving the milk in the vat to cause it to sweep over the surfaces of the coil and the walls of the vat to insure a thorough and uniform contact of all portions of the milk with these heat exchange surfaces. The stirrer shown is bifurcated, having two legs or blades 26 which straddle the coil and are connected at their upper ends above the coil by a cross head or yoke which is secured to a rock shaft 27 which extends out through a hole in the upper portion of the rear wall of the vat and is journalled in a suitable bearing 28 mounted on the upper rear portion of the jacket. The stirrer can be oscillated to stir the milk by any suitable mechanism, such as a rock arm 29 at the outer end of the rock shaft connected by a link or pitman 30 to a crank shaft 31 which is operatively connected by suitable reducing gearing in a housing 32 mounted at one end of the vat to a drive motor 33 mounted on the same end of the vat.

For cleaning the apparatus the cover is raised and the paddle or stirrer is swung up to the position shown by broken lines in Fig. 1 in which it extends out of the tank and is clear of the coil. The coil can then be disconnected from its supply and discharge pipes, when it will be free and can be lifted out of engagement with the guide studs 22 on the ends of the vat and shifted forwardly in the vat from beneath the upturned stirrer, after which the coil can be lifted up out of the vat. The coil and stirrer are thus accessible for thorough cleaning and the coil and paddle, being both lifted up out of the vat, leave the interior of the vat unobstructed so that all of the interior surfaces of the lining with which the milk contacts can be easily and thoroughly cleaned. As is well recognized, it is essential to thoroughly clean all parts with which the milk contacts after each batch of milk has been treated in the apparatus and the described construction permitting the removal of the stirring device and coil from the vat, permits ready cleansing so that the device can be kept in thoroughly sanitary condition with the least labor and trouble.

The milk can be introduced into the vat in any approved way, either by a distributer, such as used in surface coolers, arranged to discharge the milk on the upper tube of the coil so that it will flow down over the surfaces of the coil, or by a supply pipe extending down into the vat so as to discharge the milk gently therein without objectionable agitation. The milk can be discharged from the vat after treatment through the usual outlet 33.

In the construction shown in Figs. 4 to 7, which is preferred for apparatus of larger capacity, the vat may be constructed substantially as before described, except that the vat is provided with a vertically movable cover to which the coil and the stirrer are connected and which serves as a vertically movable support for these parts. The coil 40 shown in these figures consists of a series of horizontal tubes arranged vertically one above another and having upwardly bent or extending end portions which are connected to headers 41 and 42 arranged beneath and supported by the cover 43. The coil is provided with suitable supply and discharge connections. For instance, the coil may be provided at one end with a supply pipe 44 extending out through an opening at one end of the cover 43 and connected by a quick detachable coupling with a supply pipe (not shown), and the header at the opposite end of the coil may be provided with a similar discharge connection extending out through an opening in the opposite end of the cover and adapted to be similarly connected by a quick detachable coupling 45 with a discharge pipe 46.

The cover 43 is connected at its opposite ends to the vertically movable elements of suitable jacks or elevating devices, such for instance as screw jacks or hydraulically operated jacks or elevating devices of any suitable construction. In the construction shown in the drawings, the cover is secured at its ends to the upper ends of two screw shafts 50, which are adapted to turn in bearings 51 on the ends of the cover and have screw threaded engagement with internally screw threaded nuts or sleeves 52 stationarily secured to the ends of the vat jacket so that by turning these screws, the cover may be raised and lowered. For operating these screws, an operating shaft 53 is shown which extends lengthwise over the cover, being journalled in suitable bearing in gear housings 54 at the ends of the cover, and is connected by worm or other suitable gearing in said gear housings 54 with the screw shafts 50. The operating shaft is provided at one end with a crank wheel 55 or other means for rotating the same. By turning this shaft, the two screws at opposite ends of the vat are rotated simultaneously for raising and lowering the cover.

60 represents paddles or stirring devices which are arranged in a plurality of pairs with the two paddles of each pair straddling or disposed at opposite sides of the coil 40. The paddles at the rear side of the coil are connected at their upper ends to shafts 61 which are journalled in suitable bearings 62 on the cover at the rear side thereof, and the paddles at the front side of the coil are connected at their upper ends to rock shafts 63 which are journalled in suitable bearings 64 on the cover at the front side thereof. The two rock shafts 61 and 63 for each pair of paddles are provided at their outer ends with rock arms 64a which extend upwardly and are connected at their upper ends by a cross rod 65 extending transversely over the cover. These cross rods for the three pairs of paddles are preferably connected by links 66 and one of the cross rods 65, preferably the cross rod for the middle pair of paddles, is connected by a pitman or link 67 to a crank shaft 68 which is journaled in a housing 69 mounted on top of the cover and which incloses reducing gearing of any suitable construction connecting the crank shaft to a driving motor 70 also mounted on top of the cover. Thus, the paddles or stirring devices and their operating mechanism are all mounted on and carried by the cover so that when the cover is raised, the paddles will be raised therewith and lifted out of the vat to exposed elevated position above the vat, as shown in Fig. 5. In this raised position of the cover, the paddles and also the coil 40 will be supported by the jacks or elevating mechanism out of and above the vat. All parts of the coil and stirring mechanism are then readily accessible for cleaning and leave the interior of the vat also entirely unobstructed so that this also can be easily and thoroughly cleaned.

Each of the differently constructed devices described is equipped both with a heat exchange coil submerged in the milk and with means for spraying or flowing a heat exchange medium externally over the vat. The use of the combined coil and externally flowing medium approximately cuts in two both the heating and cooling time. In ordinary operation, the coil may be necessary only for cooling, as the heating time is generally short enough with the external spray alone. Cooling is always the more difficult operation, and, for this purpose, both the external spray and the coil would be used. To cool in the minimum time, brine or ice water could be used in both the external spray and in the coil. Good efficiency and economy can be obtained by using brine or ice water in the coil, and spring, well or city water in the external spray, shutting off the latter water when the milk temperature falls to that of the water. Where it is desired to economize in brine or ice water, the spray alone can be used until the milk is within a few degrees of the water temperature, and then turn off the water being used in the spray, and turn on the brine or ice water. Thus the combination of the coil and external spray affords various different possible operations of the apparatus.

The long narrow vat gives great efficiency because this not only increases the ratio of lining surface to volume, but, also increases the ratio of coil surface to volume. The paddles straddling or disposed at opposite sides of the coil effectively chase or sweep the milk over the surfaces of both the coil and the vat lining.

I claim:

1. The combination of a vat adapted to hold a body of liquid, a jacket for said vat having walls spaced from adjacent walls of the vat, means for flowing a heat exchange medium over the outer surface of said vat, a coil movably supported within said vat and having connections for circulating a heat exchange medium through said coil, a stirrer within said vat between said coil and a wall of the vat, and means for actuating said stirrer to move the liquid in the vat, said coil and said stirrer being movable to exposed positions out of said vat to render them and the inner surfaces of the vat accessible for cleaning.

2. The combination of a horizontally narrow, elongated vat adapted to hold a body of liquid, a jacket for said vat having walls spaced from adjacent walls of said vat, means for discharging a heat exchange medium externally onto and causing it to flow as a film over the long side walls of said vat inside of said jacket, and an upright stationary coil arranged lengthwise in said vat between and substantially parallel with the opposite long sides of the vat and having connections for independently circulating another heat exchange medium through said coil, circulating connections for the coil being arranged above the highest level of the liquid in the vat.

3. The combination of a narrow, elongated vat adapted to hold a body of liquid, a jacket for said vat having walls spaced from adjacent walls of said vat, means for discharging a heat exchange medium externally on to and causing it to flow as a film over said vat inside of said jacket, an upright coil arranged lengthwise in said vat between the opposite long sides of the vat and having connections for circulating a heat exchange medium through said coil, and means for moving the liquid in the vat comprising stirrer blades disposed in the vat between the opposite sides of said coil and the opposing walls of the vat, said stirrer blades and said coil being movable from their positions within the vat to exposed positions out of the vat.

4. The combination of a narrow, elongated vat adapted to hold a body of liquid, a jacket for said vat having walls spaced from adjacent walls of said vat, means for flowing a heat exchange medium externally over said vat inside of said jacket, an upright coil arranged lengthwise in said vat between the opposite long sides of the vat and having connections for circulating a heat exchange medium through said coil, a stirring device for the liquid in the vat comprising stirrer blades depending into the vat at opposite sides of said coil, and actuating means for said stirring blades connected to the upper ends thereof, said stirring device and said coil being movable from their positions in the vat to exposed positions out of the vat.

5. The combination of a vat adapted to hold a body of liquid, a jacket for the vat having walls spaced from adjacent walls of the vat, a movable top cover for the vat, an upright coil movably supported within said vat and having connections for circulating a heat exchange medium through said coil, a stirring device comprising blades depending into said vat at opposite sides of said coil, and actuating means for said stirring blades connected to the upper ends thereof, said cover being movable to open the vat at its top, said coil and stirring device being movable from their positions within the vat to exposed positions above the open top of the vat when said cover is opened.

6. The combination of a vat adapted to contain a body of liquid, a jacket for said vat having walls spaced from adjacent walls of the vat, a movable top cover for said vat, means for flowing a heat exchange liquid externally on said vat inside of said jacket, an upright coil movably supported within said vat, swinging stirrer blades pivotally supported at their upper ends and depending into said vat at opposite sides of said coil, and means for oscillating said swinging stirrer blades, said cover being movable to open the vat at its top, and said stirrer blades and coil being movable from their positions within the vat to exposed positions above the open top of the vat when said cover is opened.

7. The combination of a vat adapted to contain a body of liquid, a top cover for said vat movable upwardly from its vat-closing position, a coil depending from said cover into said vat and having connections for circulating a heat exchange medium through said coil, said cover when raised acting to raise said coil out of said vat to an exposed position above the vat, and a stirrer for the liquid mounted on said cover and adapted to be raised out of the vat when the cover is raised.

8. The combination of a vat adapted to contain a body of liquid, a top cover for said vat movable upwardly from its vat-closing position, a coil depending from said cover into said vat and having connections for circulating a heat exchange medium through said coil, a stirring device for the liquid depending from said cover into the vat, and means for raising said cover to lift said coil and stirring device out of said vat to exposed positions above the vat.

9. The combination of a vat adapted to contain a body of liquid, a top cover for said vat movable upwardly from its vat-closing position, a coil depending from said cover into said vat and having connections for circulating a heat exchange medium through said coil, means for raising said cover to lift said coil out of the vat to an exposed position above the vat, a stirrer for the liquid mounted on said cover and adapted to be raised out of the vat when the cover is raised, and actuating means for said stirrer mounted on said cover.

10. The combination of a vat adapted to contain a body of liquid, a top cover for said vat movable upwardly from its vat closing position, an upright coil depending from said cover into said vat and having connections for circulating a heat exchange medium through said coil, stirring devices for the liquid depending from said cover into said vat at opposite sides of said coil, and means for raising said cover to lift said coil and stirring devices out of the vat to accessible positions above the open top of the vat.

11. The combination of a vat adapted to contain a body of liquid, a top cover for said vat movable upwardly from its vat closing position, an upright coil depending from said cover into said vat and having connections for circulating a heat exchange medium through said coil, stirring devices pivoted on said cover and depending into said vat at opposite sides of said coil, mechanism mounted on said cover for oscillating said stirring devices, and means for raising said cover to lift said coil and stirring devices out of the vat to accessible positions above the open top of the vat.

12. The combination of a vat adapted to contain a body of liquid, a jacket for said vat having walls spaced from adjacent walls of the vat, a movable top cover for said vat, means for flowing a heat exchange liquid externally on said vat inside of said jacket, an upright coil movably supported within said vat and having fluid connections extending from the coil over the top of the vat and including quick detachable couplings for disconnecting the coil from inlet and outlet pipes, and stirring members depending into the vat beside said coil, said coil and stirring members being movable from their positions in the vat to accessible positions above the open top of the vat when said cover is opened.

13. The combination of a vat adapted to contain a body of liquid, a jacket for said vat having walls spaced from adjacent walls of the vat, a movable top cover for said vat, means for flowing a heat exchange liquid externally on said vat inside of said jacket, an upright coil movably supported within said vat and having fluid connections extending from the coil over the top of the vat and removably supporting the coil, said connections including quick detachable couplings for disconnecting the coil from inlet and outlet pipes, and stirring members depending into the vat beside said coil, said coil and stirring members being movable from their positions in the vat to accessible positions above the open top of the vat when said cover is opened.

14. The combination of a horizontally narrow, elongated jacketed vat adapted to hold a body of liquid, means for discharging a heat exchange medium externally on to and causing it to flow as a film over said vat inside of the jacket, and a normally stationary but movably mounted upright coil arranged lengthwise in said vat between and substantially parallel with the opposite long sides of the vat and having connections for circulating a heat exchange medium through said coil, said circulating connections for the coil being arranged above the highest level of the liquid in the vat and constructed to enable ready shifting of the coil intact as a unit from its position in the vat to an exposed position to facilitate cleaning the coil and vat.

15. The combination of a narrow, elongated vat adapted to hold a body of liquid, a jacket for said vat, a movable cover for the vat, means for discharging a heat exchange medium externally on to and causing it to flow as films over the opposite long side walls of said vat inside of said jacket, a coil arranged lengthwise in said vat between and substantially parallel with the opposite long side walls of the vat, said coil being supported by said cover and being shifted to accessible cleaning position by the raising of the cover, and connections for circulating a heat exchange medium through said coil.

HARVEY FELDMEIER.